(12) United States Patent
Bai (10) Patent No.: US 10,527,319 B2
(45) Date of Patent: Jan. 7, 2020

(54) GEOTHERMAL HEAT EXCHANGE SYSTEM AND CONSTRUCTION METHOD THEREOF

(71) Applicant: BIC INC., Daejeon (KR)

(72) Inventor: Min Bai, Seoul (KR)

(73) Assignee: BIC INC., Daejeon (KR)

( * ) Notice: Subject to any disclaimer, the term of this patent is extended or adjusted under 35 U.S.C. 154(b) by 4 days.

(21) Appl. No.: 16/005,541

(22) Filed: Jun. 11, 2018

(65) Prior Publication Data

US 2018/0363953 A1    Dec. 20, 2018

(30) Foreign Application Priority Data

Jun. 15, 2017 (KR) .................. 10-2017-0075828
Jun. 4, 2018 (KR) .................. 10-2018-0064134

(51) Int. Cl.
*F28D 7/00* (2006.01)
*F24T 10/15* (2018.01)
(Continued)

(52) U.S. Cl.
CPC .............. *F24T 10/15* (2018.05); *F24T 10/13* (2018.05); *F24T 2010/53* (2018.05); *F28F 2270/00* (2013.01)

(58) Field of Classification Search
CPC .......... C04B 28/02; F28T 10/30; F28T 10/15; F28T 2010/53; F28F 2270/00; F24J 3/086; F24J 3/08; F28D 15/075; F28D 15/0283
(Continued)

(56) References Cited

U.S. PATENT DOCUMENTS 5,816,314 A * 10/1998 Wiggs ................ F24T 10/15
                                                        165/45
6,041,862 A    3/2000 Amerman
(Continued)

FOREIGN PATENT DOCUMENTS

CA         2999878       3/2017
CN       10-1349450      1/2009
(Continued)

OTHER PUBLICATIONS

Extended European Search Report, dated Oct. 8, 2018, received in European Patent Application No. 18 17 7353.
(Continued)

*Primary Examiner* — David D Hwu
(74) *Attorney, Agent, or Firm* — Davis Wright Tremaine LLP; Heather M. Colburn (57) ABSTRACT

The present invention relates to a geothermal heat exchange system and a method of constructing a geothermal heat exchange system, and more specifically, to a geothermal heat exchange system which is to be installed in a borehole in the ground, the borehole being divided into a ground surface section and a shallow geothermal source section, the shallow geothermal source section of the borehole, which is hardly influenced by the atmospheric or ground surface temperatures, is filled with conventional heat conductive grouting material with high thermal conductivity, and the ground surface section of the borehole is filled with thermal insulation grouting material or thermal insulation cartridges to prevent the heat transferring medium in the geothermal heat exchange system, which has the geothermal heat obtained from the shallow geothermal source, from losing heat in the winter time or obtaining heat in the summer time when it passes through the ground surface section which is much influenced by the atmospheric or ground surface temperatures, thereby a geothermal heat exchange system that can increase the acquisition rate of geothermal energy, and a method of constructing the geothermal heat exchange system.

20 Claims, 4 Drawing Sheets

(51) Int. Cl.
*F24T 10/13* (2018.01)
*F24T 10/00* (2018.01)

(58) Field of Classification Search
USPC .......................................................... 165/45
See application file for complete search history.

(56) References Cited

U.S. PATENT DOCUMENTS

| | | |
|---|---|---|
| 6,251,179 B1 | 6/2001 | Allan |
| 2010/0258266 A1 | 10/2010 | Stojanowski |
| 2010/0276115 A1* | 11/2010 | Parrella .................. F24T 10/30 165/45 |
| 2011/0232795 A1 | 9/2011 | Hardin |
| 2013/0216802 A1* | 8/2013 | Leung .................... C04B 28/02 428/215 |

FOREIGN PATENT DOCUMENTS

| | | |
|---|---|---|
| JP | 2007527493 | 9/2007 |
| KR | 10-0778936 | 11/2007 |
| KR | 10-0985854 | 10/2010 |
| KR | 10-1358251 | 2/2014 |
| KR | 10-2015-0032677 | 1/2015 |
| RU | 2256774 | 7/2005 |
| WO | 2008/130107 | 10/2008 |
| WO | 2017/020893 | 2/2017 |
| WO | 2018/014609 | 1/2018 |

OTHER PUBLICATIONS

English Translation of Korean Patent Publication No. 10-0778936.
English Translation of Korean Patent No. 10-0985854.
English Translation of Korean Patent No. 10-1358251.
English Translation of Korean Patent Publication No. 10-2015-0032677.

* cited by examiner

GEOTHERMAL HEAT EXCHANGE SYSTEM AND CONSTRUCTION METHOD THEREOF

FIELD OF THE INVENTION

The present invention relates to a geothermal heat exchange system and a method of constructing a geothermal heat exchange system, more specifically, to a geothermal heat exchange system which is to be installed in a borehole in the ground, the borehole being divided into a ground surface section and a shallow geothermal source section, the shallow geothermal source section of the borehole, which is hardly influenced by the atmospheric or ground surface temperatures, is filled with conventional heat conductive grouting material with high thermal conductivity, and the ground surface section of the borehole is filled with thermal insulation grouting material or thermal insulation cartridges to prevent the heat transferring medium in the geothermal heat exchange system, which has the geothermal heat acquired in the shallow geothermal source section, from losing heat in the winter time or obtaining heat in the summer time when it passes through the ground surface section which is influenced a lot by the atmospheric or ground surface temperatures, thereby the geothermal heat exchange system and the method of constructing the geothermal heat exchange system can increase the heat gain of geothermal energy.

BACKGROUND OF THE INVENTION

Geothermal source sections cover systems consist of both shallow and deep geothermal source section. Usually, shallow geothermal boreholes, 15-200 m, are used as heat source for ground source heat pump (GSHP) systems. Deep geothermal boreholes, typically 1-10 km, can retrieve heat with higher temperature, and are used as a heat source for running a geothermal power plant.

In general, the ground temperature is higher than the atmospheric temperature in the winter time. Therefore, a ground source heat pump (GSHP) system absorbs geothermal heat from the ground and uses it for heating. In the summer time, inversely, the atmosphere is cooled in the ground having lower temperature than the atmospheric temperature.

For the vertical closed loop geothermal system which is most widely used among the GSHP systems, various types of grouting materials and grouting methods are known to install a thermal heat exchange system in a borehole which is dug vertically in the ground and to fill up the space between the geothermal heat exchange system and the borehole.

For example, Korean Patent Publication No. 10-0985854 (published on Oct. 8, 2010) discloses a grouting method in which a borehole is formed at a depth of 150 to 200 m in the ground and a vertical closed loop geothermal system is installed, then pebbles having an average diameter of about 5 to 30 mm are charged from the bottom of the borehole to the rock formation to improve the heat conductivity, and grouting is carried out from the rock formation to the ground with non-shrink mortar to prevent the infiltration of external contaminants from flowing into the borehole.

Meanwhile, Korean Patent Publication No. 10-1358251 (published on Feb. 5, 2014) discloses a grouting method in which sticks are inserted into a borehole, where a geothermal heat exchange system is installed, the sticks are being made by filling a long tube that is breakable by expansion with a mixture of 20 to 30% by weight of bentonite and 70 to 80% by weight of silica sand, then the bentonite included in the mixture expands by water to tightly grout the borehole.

In addition, Korean Patent Publication Laid-Open No. 10-2015-0032677 (published on Mar. 27, 2015) discloses a grouting method in which, instead of conventional bentonite grouting material, the crushed rocks are filled up to a natural water level detected in a borehole in which a geothermal heat exchange system is installed at a depth of 150 to 200 m in the ground, and the remaining part is filled with bentonite to prevent the infiltration of external contaminants and to increase the thermal conductivity of the geothermal heat exchange system further.

BRIEF SUMMARY OF THE INVENTION

The above prior art mainly relates to grouting methods for a geothermal heat exchange system. In these methods, the geothermal heat exchange system mainly aims at enhancing the thermal conductivity of the grouting material in order to effectively absorb geothermal heat around the borehole. However, in the process of carrying on the heat exchange medium having the geothermal heat acquired by the geothermal heat exchange system in the shallow geothermal source section to the ground level, the possibility of heat lost in the ground surface section near the surface in the winter time and overheating of the heat transfer fluid in the summer time has been overlooked.

Figure 1:
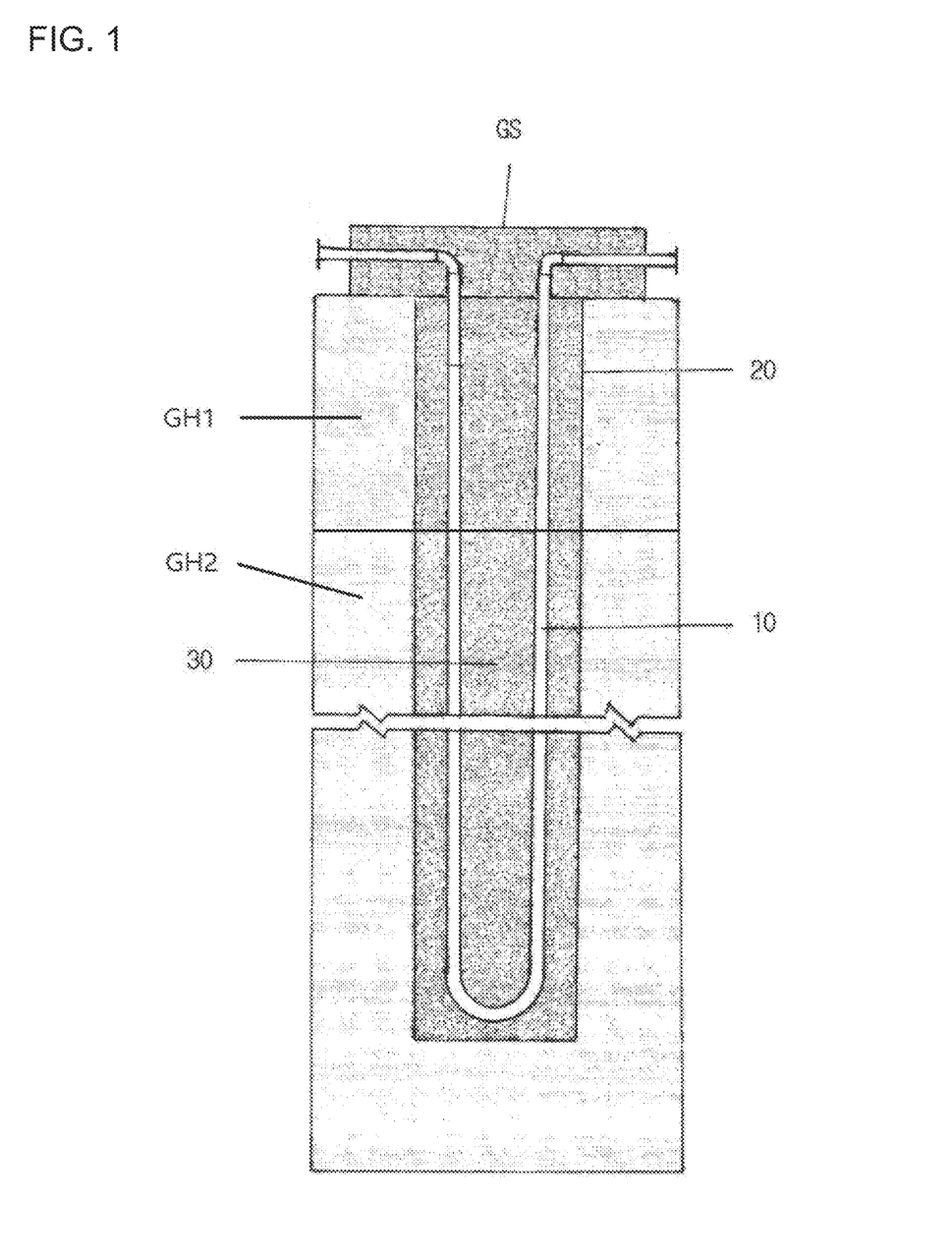
FIG. 1 shows an embodiment of a conventional geothermal heat exchange system.

For example, when a geothermal heat exchange system is installed in a borehole 20 by the conventional method shown in FIG. 1, the ground surface section GH1 which is affected by the atmospheric temperature is located near the ground surface, this section covers up to about 10 m depth in the case of Seoul, Korea, and difference between the highest and the lowest temperature is about 1 to 40° C. depending on the depth.

The shallow geothermal source section GH2 maintains a relatively constant temperature of about 15 to 20° C. for all the year round depending on the depth from about 15 m to 200 m under the ground, and in order to use the acquired geothermal heat on the ground, the heat exchange medium flowing in the heat exchange pipe 10 must pass through the ground surface section GH1. In this process, heat energy can be lost by difference of temperatures between the ground surface section GH1 and the shallow geothermal source section GH2 in the winter time. In the summer time, since the temperature of the ground surface section GH1 is higher than that of the shallow geothermal source section GH2, the cooled heat exchange medium in the shallow geothermal source section GH2 could be heated in the ground surface section GH1, thereby the cooling efficiency could be decreased.

The reason why this problem has happened is that, in the conventional method, the heat conductive grouting material 30 such as bentonite, crushed stone and pebbles are used to fill the entire length of borehole 20 around the geothermal heat exchange system without distinguishing the shallow geothermal source section and the ground surface section.

The technology that uses geothermal heat acquired by the GSHP system for cooling and heating uses the thermal energy under the ground having the temperature of only 10 to 20° C., so it is very important to acquire more heat energy even if it corresponds to 1 to 2° C. only, and possibility of losing a small portion of heat energy could be a sensitive issue.

Therefore, it is an object of the present invention to provide a geothermal heat exchange system having dual grouting structure that is to be installed in a borehole under the ground, the borehole being divided into a ground surface section of which temperature hardly changes all the year round and a shallow geothermal source section which is influenced by the atmospheric or ground surface temperatures, the shallow geothermal source section of the borehole is filled with conventional heat conductive grouting material to form a heat transfer portion, the ground surface section of the borehole is filled with thermal insulation grouting material, thereby the loss of heat energy is minimized, and a method of constructing such a geothermal heat exchange system having dual grouting structure.

Another object of the present invention is to provide a geothermal heat exchange system having dual grouting structure that is to be installed in a borehole under the ground, the borehole being divided into a ground surface section of which temperature hardly changes all the year round and a shallow geothermal source section which is influenced by the atmospheric or ground surface temperatures, the shallow geothermal source section of the borehole is filled with conventional heat conductive grouting material to form a heat transfer portion, at least one stackable thermal insulation cartridge which is filled with thermal insulation material is arranged in the ground surface section of the borehole, thereby the loss of heat energy is minimized, and a method of constructing the geothermal heat exchange system having dual grouting structure.

Another object of the present invention is to provide a thermal insulation material and thermal insulation cartridge which are suitable for use in the geothermal heat exchange system and can increase the efficiency of cooling and heating by preventing the heat loss or over heating of a heat transfer fluid when it passes the ground surface section.

SOLUTION

According to an embodiment of the present invention, there is provided a geothermal heat exchange system to be installed in a borehole, which is divided into a ground surface section and a shallow geothermal source section comprising: a heat transfer portion formed by filling the shallow geothermal source section of the borehole with a heat conductive grouting material to acquire geothermal heat from the shallow geothermal source; a cutoff wall constructed at a periphery of the ground surface section of the borehole; a thermal insulation portion formed by filling the ground surface section of the borehole surrounded by the cutoff wall with an insulating grouting material; and heat exchange pipes which pass through the thermal insulation portion and the heat transfer portion, in which heat exchange medium flows.

According to another embodiment of the present invention, there is provided a geothermal heat exchange system to be installed in a borehole, which is divided into a ground surface section and a shallow geothermal source section comprising: a heat transfer portion formed by filling the shallow geothermal source section of the borehole with a heat conductive grouting material to acquire geothermal heat from the shallow geothermal source; one or more stackable thermal insulation cartridges installed in the ground surface section of the borehole; and heat exchange pipes which pass through the thermal insulation portion and the heat transfer portion, in which heat exchange medium flows.

According to another embodiment of the present invention, there is provided a thermal insulation cartridge used in such a geothermal heat exchange system, which is composed of an inner and an outer pipe, a thermal insulation material is filled between the inner pipe and the outer pipe, a thermal insulation grouting material is filled in the inner pipe, and said heat exchanging pipes are passed through the inner pipe.

Preferably, the thermal insulation cartridge comprises caps for closing a space between the inner pipe and the outer pipe at the top and bottom of the inner pipe and the outer pipe.

Preferably, the material of the thermal insulation cartridge is plastic.

Preferably, the thermal insulation grouting material is a high porosity foamed concrete (HPFC), cement mixed with vermiculite, cement mixed with volcanic stone, or cement mixed with a foaming agent of aluminum powders.

Preferably, the thermal insulation grouting material is a high porosity foamed concrete (HPFC).

Preferably, a trench in which the inlet pipes and the outlet pipes of the heat exchange systems and the heat pump are connected via a manifold are also filled with a thermal insulation grouting material.

As the thermal insulation material to be filled, urethane foam, Styrofoam, glass wool, rock wool, etc. may be used alone or in combination.

In addition, the HPFC may be added with a superplasticizer and/or a bubbling forming agent.

According to another embodiment of the present invention, method of constructing a geothermal heat exchange system having dual grouting structure comprising the steps of: forming a borehole for installing a geothermal heat exchange system and dividing the borehole into a ground surface section and a shallow geothermal source section; inserting heat exchange pipes, in which a heat exchange medium flows, in the borehole; forming a heat transfer portion for acquiring geothermal heat from the shallow geothermal source by filling the shallow geothermal source section of the borehole with a heat conductive grouting material; constructing a cutoff wall around the ground surface section of the borehole; and forming a thermal insulation portion by filling an insulating grouting material in the ground surface section of the borehole surrounded by the cutoff wall; is provided.

Preferably, after the step of forming the thermal insulation portion, the method further comprises a step of constructing a trench with a thermal insulation grouting material, in which the inlet pipes and the outlet pipes of the heat exchange systems and the heat pump are connected via a manifold.

According to another embodiment of the present invention, there is provided a method of constructing a geothermal heat exchange system comprising the steps of: forming a borehole for installing the geothermal heat exchange system and dividing the borehole into a ground surface section and a shallow geothermal source section; installing heat exchange pipes, in which a heat exchange medium flows, in the borehole; forming a heat transfer portion for acquiring geothermal heat from a shallow geothermal source by filling a shallow geothermal source section of the borehole with a heat conductive grouting material; and forming a thermal insulation portion by providing at least one stackable thermal insulation cartridge in a ground surface section of the borehole.

According to the present invention, a borehole in which a geothermal heat exchange system is to be installed is divided into a ground surface section which is influenced by the atmospheric or ground surface temperature and a shallow geothermal source section which is hardly influenced by the atmospheric or ground surface temperatures all the year around, the shallow geothermal source section of the borehole is filled with conventional heat conductive grouting material to form a heat transfer portion, and the ground surface section is filled with a heat conductive grouting material to form a heat transfer portion for acquiring geothermal heat from the shallow geothermal source. Therefore, it is possible to obtain geothermal heat more satisfactorily as compared with the case where the borehole is filled only with the conventional heat conductive grouting materials, and it is possible to effectively prevent the heat loss of the acquired geothermal heat or the temperature rise of the heat transfer fluid.

In addition, since the insulation grouting material used in the thermal insulation portion, which is formed in the ground surface section of the borehole, is filled with HPFC (High Porosity Foamed Concrete), the thermal insulation effect can be enhanced and, due to the prevention of the heat loss or the temperature rise of the heat transfer fluid, the acquisition rate of the geothermal heat is increased. And, the infiltration of pollutants or water from outside is blocked by the cutoff wall, so that the surrounding environment of the borehole can be safely protected.

Further, in the present invention, at least one stackable thermal insulation cartridge filled with a thermal insulation material is installed in a ground surface section of a borehole, and the thermal insulation cartridge is composed of an inner and an outer pipe, the space between the inner pipe and the outer pipe is filled with a thermal insulation material, and the heat exchange pipe is passed through the space inside the inner pipe, it is not necessary to separately install a cutoff wall, and it is possible to maintain the performance of the geothermal heat exchange system by protecting the insulating material filled in the pipes from the external environment.

DETAILED DESCRIPTION OF THE INVENTION

In this specification, the expressions "have", "includes", "comprises", etc. refer to the presence of a feature and do not preclude the presence of additional features.

All terms used herein, including technical or scientific terms, may have the same meaning as commonly understood by one of ordinary skill in the art.

Commonly used predefined terms may be construed as having the same or similar meaning as the contextual meanings of the related art and are not to be construed as an ideal or overly formal sense unless expressly defined to the contrary herein. In some cases, the terms defined herein may not be construed to exclude embodiments of the present invention.

Figure 2:
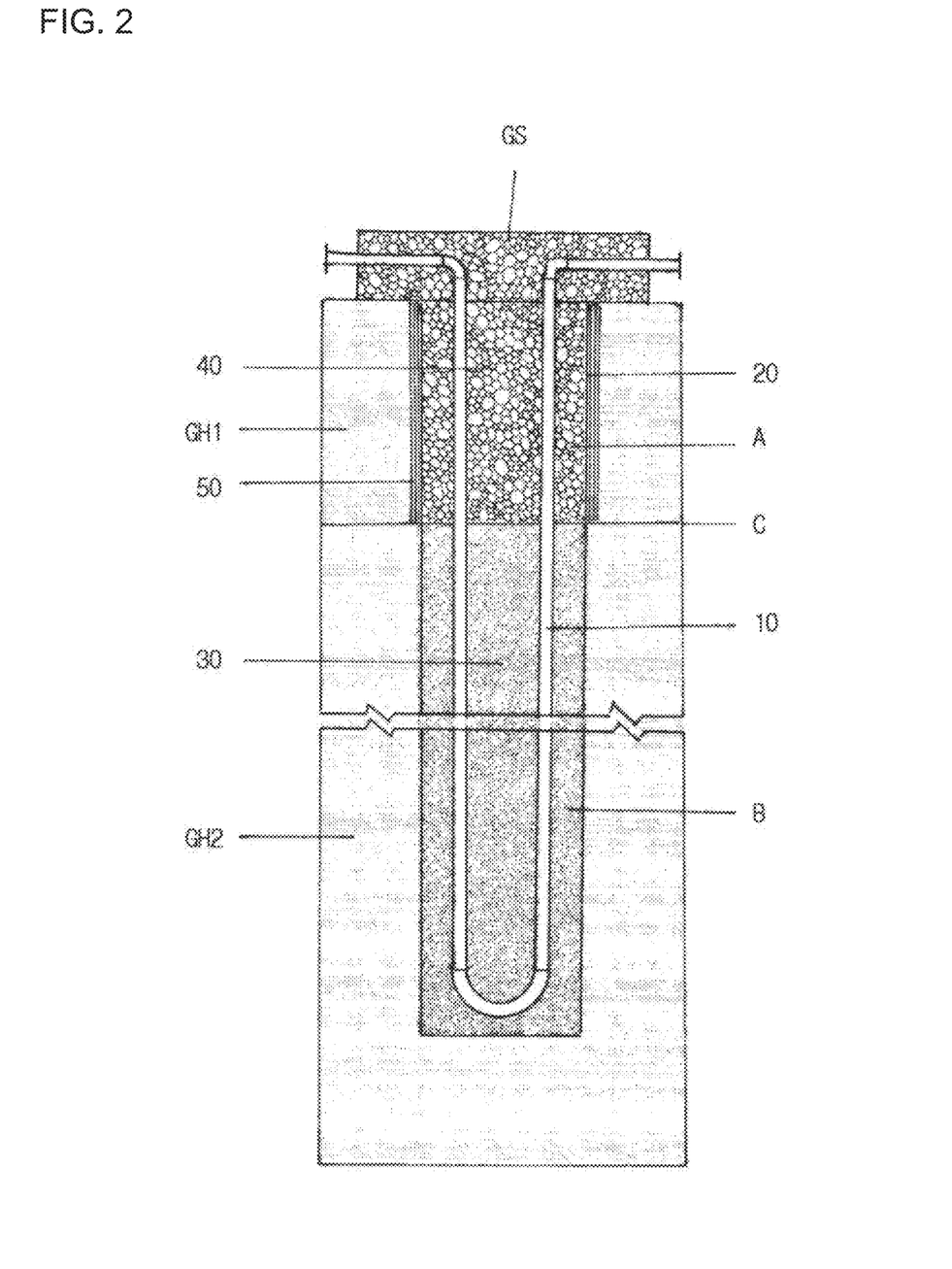
FIG. 2 is a diagram illustrating the first embodiment of a geothermal heat exchange system according to the present invention.

FIG. 2 is a diagram illustrating an embodiment of a geothermal heat exchange system according to the present invention. As shown in FIG. 2, when a geothermal heat exchange system, in which the heat exchange pipes 10 are connected together through a ground surface section GH1 which is about 15 m deep and a shallow geothermal source section GH2 which is 15 to 200 m deep from the ground, is installed in a borehole 20, the borehole 20 was filled with the heat conductive grouting material to improve the transfer of geothermal heat and to prevent the borehole from infiltration of external water and pollutants from the surrounding soil.

In the present invention, the borehole 20, in which a geothermal heat exchange system is to be installed, is divided into a ground surface section GH1 which is influenced by the atmospheric and surface temperature, and a shallow geothermal source section GH2 of which temperature hardly changes all the year round.

That is, most part of the borehole corresponding to the shallow geothermal source section GH2 which is deeply drilled in the ground is filled with a heat conductive grouting material 30 which conducts the geothermal heat well to the geothermal heat exchange system to form the heat transfer portion, a cutoff wall 50 is provided around in the ground surface section GH1 of the borehole to prevent inflow of water and contaminants from the outside, and the ground surface section GH1 surrounded by the cutoff wall is filled with thermal insulation grouting material 40 to form the thermal insulation portion in order to prevent any possible heat loss or temperature rise of the heat transfer fluid in the ground surface section GH1 when the geothermal heat acquired by heat transfer medium from the shallow geothermal source section GH2 is extracted on the ground, thereby a dual grouting structure of heat exchange system is completed.

The heat conductive grouting material 30 which fills the borehole part of the shallow geothermal source section GH2 may include bentonite, bentonite mixed with sand, bentonite mixed with carbon or graphite, or bentonite mixed with pebbles, which can transfer the geothermal heat well to the heat exchange system.

Though the boundary between the shallow geothermal source and the combined geothermal source is not fixed depending on the region, it can be found by the temperature measurement with the depth at the time of drilling the borehole.

As the thermal insulation grouting material 40, a grout material having lots of small and uniform bubbles that are distributed evenly, thus having a low bulk density and a relatively low thermal conductivity, can be selectively applied.

For example, high porosity formed concrete (HPFC), cement mixed with vermiculite, cement mixed with volcanic stone, or cement mixed with a foaming agent of aluminum powders can be applied.

The most preferred thermal insulation grouting material 40 for use in the present invention is the high porosity foamed concrete (HPFC), and a superplasticizer may be added thereto.

In order to fill the borehole 20 with HPFC, cement mortar is injected into the borehole 20 while generating air bubbles by injecting air with a compressor into the cement mortar in which a superplasticizer is added. The injected cement mortar is containing evenly distributed air bubbles therein by the dispersing action of the added superplasticizer, so that after the curing, a HPFC having evenly distributed closed bubbles is completed.

Further, the cement mortar having a foaming agent may be used to generate more bubbles, or may be used with above said air injection method.

Furthermore, the HPFC can be applied not only as the grouting material of the borehole for the ground surface section GH1, but also as the grouting material for the trench (GS) on the ground in which the inlet pipes and the outlet pipes of the heat exchange systems and the heat pump are connected via a manifold.

The thermal insulation grouting material 40 made up of the HPFC, which is filled and cured in the borehole, has excellent thermal insulation performance, thereby preventing the geothermal heat acquired in the shallow geothermal source section GH2 from heat loss or over heating of the heat transfer fluid when it passes through the ground surface section of the borehole. And, it is possible to enhance the efficiency of the geothermal heat pump, and to prevent the infiltration of pollutants from outside by the cutoff wall, thereby the safe protection of the borehole from the surrounding environment can be fulfilled.

First Embodiment

The method of constructing the geothermal heat exchange system according to the first embodiment of the present invention is as follows:

1. Dividing the Grouting Sections of a Borehole

As shown in FIG. 2, the borehole 20, in which a geothermal heat exchange system 10 including U-shaped pipes is to be installed, is divided into a part of the ground surface section GH1 having a depth of about 15 m under the ground, of which temperature is influenced by the atmospheric temperature, and a part of the shallow geothermal source section GH2 at depths of about 15 to 200 m, which maintains an underground temperature of about 15-20° C.

The portion of the ground surface section GH1 in the borehole 20 will be formed as the thermal insulation portion A, and the remaining portion of the shallow geothermal source section GH2 in the borehole 20 will be formed as the heat transfer portion B. The boundary line C between the two portions should be set to the depth at which the shallow geothermal source begins certainly according to the temperature measured with depth at the borehole. Since the boundary line between the ground surface geothermal source and the shallow geothermal source varies depending on the region, the depth is not fixed one.

2. Grouting of the Borehole by Different Sections

A heat conductive grouting material 30 is filled up the shallow geothermal source section GH2 in the borehole 20 in which the heat exchange pipes 10 are installed already.

As the heat conductive grouting material 30, for example, a bentonite mixed with sand is filled up to the level of the boundary line C of the borehole 20 and grouting is performed to form the heat transfer portion B.

The filled bentonite mixture expands to a range of the allowable space of the borehole 20 by groundwater existing in the borehole 20, whereby the borehole 20 is air tightly grouted.

Since the heat exchange pipe 10 of the geothermal heat exchange system may be deformed due to excessive expansion pressure of the bentonite, it is preferable to consider the volume of the borehole 20 to the boundary line C of the shallow geothermal source section GH2 and an appropriate amount of bentonite in advance.

Then, cutoff wall 50 is constructed from the boundary line C to the ground which corresponds to the ground surface section GH1 of the remaining borehole 20, and the thermal insulation grouting material 40 is filled in the borehole surrounded by the cutoff wall 50 to form the thermal insulation portion A.

Bentonite, concrete, steel pipe, synthetic resin pipe and the like are used as the material of cutoff wall 50.

As the thermal insulation grouting material 40, cement mortar made by mixing cement, water and superplasticizer is injected into the borehole 20 while causing air bubbles by a compressor to perform grouting.

When excessive air is injected into the cement mortar, the amount of air bubbles is increased, but the strength of the concrete is lowered, so balancing the proper strength of the concrete and the porosity rate for insulation is required.

The superplasticizer is a kind of surfactant of polymer material to maintain the fluidity of the cement mortar particles and to increase dispersibility to form evenly distributed bubbles.

Further, the thermal insulation grouting material 40 to be filled in the borehole 20 is not limited to the HPFC, and various kinds of organic and inorganic insulating materials can be selectively applied.

The HPFC as the thermal insulation grouting material 40 may be applied to the trenches GS in which the inlet pipes and the outlet pipes of the heat exchange systems and the heat pump are connected via a manifold.

In the present embodiment, the heat conductive grouting material 30 used in the heat transfer portion B of the shallow geothermal source section GH2 has the good thermal conductivity of geothermal heat to the heat exchange medium which circulates in the heat exchange pipe 10. Therefore, the heat exchanging performance of the geothermal heat exchange system can be improved considerably.

Due to the thermal insulation grouting material 40 in the thermal insulation section A of the ground surface section GH1, the geothermal heat acquired from the shallow geothermal source section GH2 can be preserved, it is possible to utilize the geothermal heat more effectively since the heat gain of geothermal heat by the geothermal heat exchange system is increased.

Second Embodiment

Figure 3A:
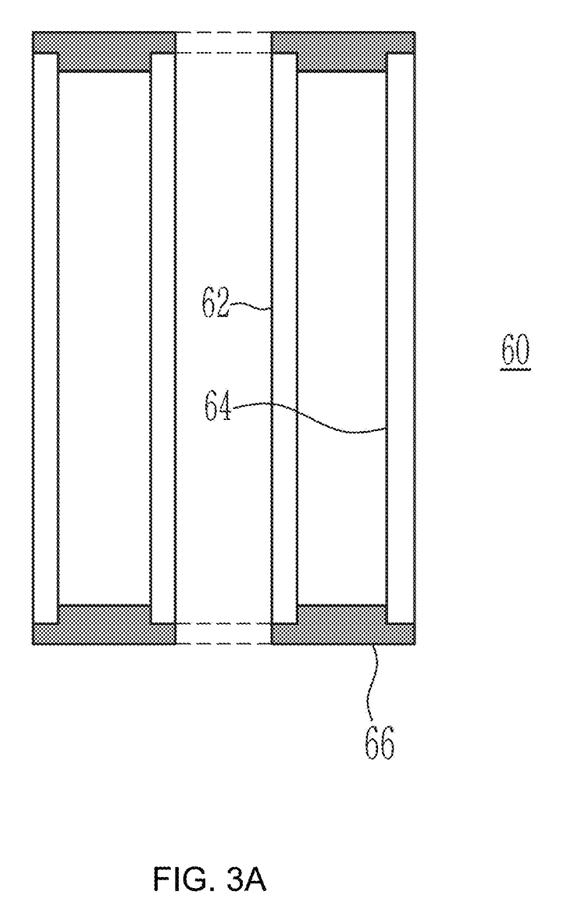
FIG. 3A is a cross-sectional view of a stackable thermal insulation cartridge used in a geothermal heat exchange system of the present invention.
Figure 3B:
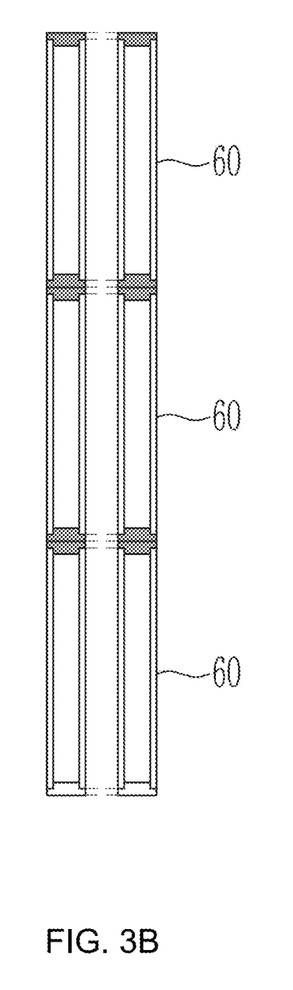
FIG. 3B is a schematic view showing a stacked state of the thermal insulation cartridges.
Figure 4:
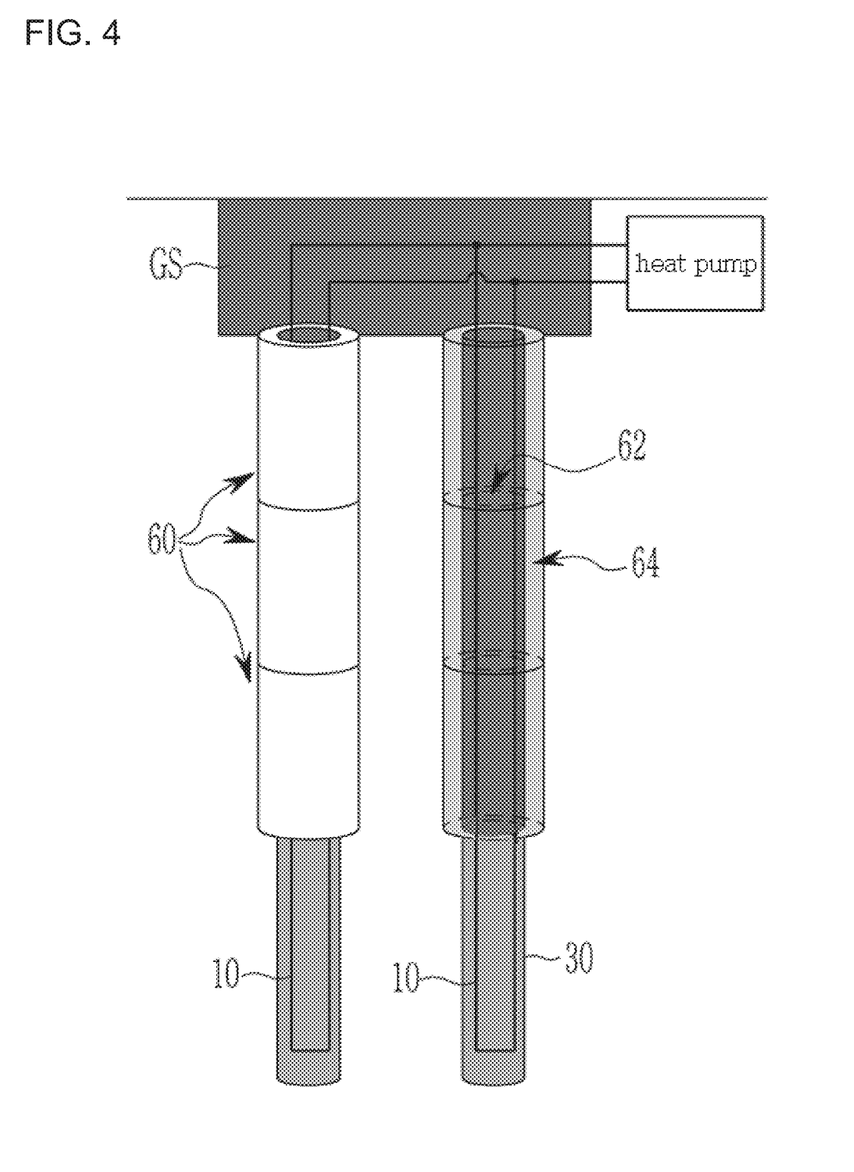
FIG. 4 is a view illustrating a geothermal heat exchange system according to the second embodiment of the present invention using the thermal insulation cartridges in FIGS. 3A and 3B.

A second embodiment of the present invention will be described with reference to FIG. 3 and FIG. 4.

The geothermal heat exchange system and its construction method for the second embodiment of the present invention are different from those of the first embodiment in that the cutoff wall 50 and the thermal insulation portion B in the first embodiment are substituted with one or more stackable thermal insulation cartridges 60.

Just like the thermal insulation portion B in the first embodiment, the stackable thermal insulation cartridge 60 is constructed to prevent heat loss or temperature rise of the heat transfer medium when it passes through the ground surface section GH1 of which temperature is affected very much by the atmospheric temperature. The stackable thermal insulation cartridge 60 has superior thermal insulation performance, can block the surface water as well as the groundwater, and can be stackable according to the length of the thermal insulation portion B. Thus, it can be manufactured with the dimension of which delivery and construction is convenient, and assembling them in site is also very convenient.

The stackable thermal insulation cartridge 60 installed in the ground surface section GH1 of the geothermal heat exchange system according to the second embodiment of the present invention comprises a cylindrical inner pipe 62 and a cylindrical outer pipe 64 formed of a plastic material. The space between the inner pipe 62 and the outer pipe 64 is filled with a thermal insulation material.

Since the inner pipe 62 and the outer pipe 64 are formed of plastic material, water is cut off to protect the insulated material filled in the cartridge 60 from the external environment and to maintain the performance of the cartridge 60.

As the thermal insulation material to be filled, urethane foam, Styrofoam, glass wool, rock wool, etc. may be used alone or in combination.

Meanwhile, the inner pipe 62 is filled with above-mentioned thermal insulation grouting materials, namely, HPFC, cement mixed with vermiculite, cement mixed with volcanic stone, or cement mixed with a foaming agent of aluminum powders, preferably, HPFC is filled up the inner pipe 62 and the heat exchange pipes 10 are located in the inner pipe 62.

On the other hand, the stackable thermal insulation cartridge 60 may have caps 66 that seals the space between the inner pipe 62 and the outer pipe 64 at the top or the bottom of the pipes, thereby facilitating the positioning of the heat exchange pipe 10 passing through the inside thereof as well as preventing the heat loss of the thermal insulation material and the infiltration of ground water.

It is preferable that the inner diameter of the inner pipe 62 is equal to the diameter of the heat transfer portion B filled in advance, and the same function as the thermal insulation portion A in the first embodiment can be realized by stacking a plurality of the thermal insulation cartridges 60.

The embodiments disclosed herein are only provided to facilitate explanation and understanding of the disclosed technical contents, and do not limit the scope of the present invention.

Accordingly, the scope of the present invention should be construed as including all modifications or various other embodiments based on the technical idea of the present invention.

What is claimed is:

1. A geothermal heat exchange system to be installed in a borehole, which is divided into a ground surface section and a shallow geothermal source section, which comprises:
   a heat transfer portion formed by filling the shallow geothermal source section of the borehole with a heat conductive grouting material to acquire geothermal heat from the shallow geothermal source section;
   a cutoff wall constructed at a periphery of the ground surface section of the borehole and terminated at a junction of the ground surface section and the shallow geothermal source section to prevent inflow of water and contaminants from outside;
   a thermal insulation portion formed by filling the ground surface section of the borehole surrounded by the cutoff wall with an insulating grouting material; and
   heat exchange pipes which pass through the thermal insulation portion and the heat transfer portion, in which heat exchange medium flows.

2. The geothermal heat exchange system according to claim 1, wherein the insulating grouting material is a high porosity foamed concrete ("HPFC").

3. The geothermal heat exchange system according to claim 2, wherein the HPFC is added with a superplasticizer and/or a foaming agent.

4. The geothermal heat exchange system according to claim 1, wherein a trench in which inlet pipes and outlet pipes of the geothermal heat exchange system and a heat pump are connected via a manifold is filled with a thermal insulation grouting material.

5. A geothermal heat exchange system to be installed in a borehole, which is divided into a ground surface section and a shallow geothermal source section, which comprises:
   a heat transfer portion formed by filling the shallow geothermal source section of the borehole with a heat conductive grouting material to acquire geothermal heat from the shallow geothermal source section;
   one or more stackable thermal insulation cartridges installed in the ground surface section of said borehole, the one or more stackable thermal insulation cartridges comprising a stackable thermal insulation cartridge; and
   heat exchange pipes which pass through a thermal insulation portion and the heat transfer portion, in which heat exchange medium flows, wherein the stackable thermal insulation cartridge is composed of an inner pipe and an outer pipe, a thermal insulation material is filled in a space between the inner pipe and the outer pipe.

6. The geothermal heat exchange system according to claim 5, wherein a thermal insulation grouting material is filled in the inner pipe, and said heat exchange pipes are located inside the inner pipe.

7. The geothermal heat exchange system according to claim 5, wherein the stackable thermal insulation cartridge further comprises caps for closing the space between the inner pipe and the outer pipe at the top and bottom of the inner pipe and the outer pipe.

8. The Geothermal heat exchange system according to claim 6, wherein the thermal insulation grouting material is a high porosity foamed concrete ("HPFC").

9. The geothermal heat exchange system according to claim 8, wherein the HPFC is added with a superplasticizer and/or a foaming agent.

10. A stackable thermal insulation cartridge to be installed in a ground surface section of a geothermal heat exchange system in a borehole, which is divided into a ground surface section and a shallow geothermal source section,
    wherein the stackable thermal insulation cartridge is composed of an inner pipe and an outer pipe, a thermal insulation material is filled between the inner pipe and the outer pipe, a thermal insulation grouting material is filled in the inner pipe, and heat exchanging pipes are passed through the inner pipe.

11. The stackable thermal insulation cartridge according to claim 10, further comprising caps for closing a space between the inner pipe and the outer pipe at the top and bottom of the inner pipe and the outer pipe.

12. The stackable thermal insulation cartridge according to claim 10, wherein the thermal insulation grouting material is a high porosity foamed concrete ("HPFC").

13. A method of constructing a geothermal heat exchange system comprising the steps of:
    forming a borehole for installing the geothermal heat exchange system and dividing the borehole into a ground surface section and a shallow geothermal source section;
    installing heat exchange pipes, in which a heat exchange medium flows, in the borehole;
    forming a heat transfer portion for acquiring geothermal heat from the shallow geothermal source section by filling the shallow geothermal source section of the borehole with a heat conductive grouting material;

constructing a cutoff wall around the ground surface section of the borehole, the cutoff wall being terminated at a junction of the ground surface section and the shallow geothermal source section to prevent inflow of water and contaminants from outside; and forming a thermal insulation portion by filling an insulating grouting material in the ground surface section of the borehole surrounded by the cutoff wall.

14. The method of constructing a geothermal heat exchange system according to claim 13, further comprising a step of constructing a trench with the insulating grouting material, in which inlet pipes and outlet pipes of the geothermal heat exchange system and a heat pump are connected via a manifold, after the step of forming the thermal insulation portion.

15. The method of constructing a geothermal heat exchange system according to claim 13, wherein the insulating grouting material is a high porosity foamed concrete ("HPFC").

16. The method of constructing a geothermal heat exchange system according to claim 15, wherein the HPFC is added with a superplasticizer and/or a foaming agent.

17. A method of constructing a geothermal heat exchange system comprising the steps of:

forming a borehole for installing a geothermal heat exchange system and dividing the borehole into a ground surface section and a shallow geothermal source section;

installing heat exchange pipes in which a heat exchange medium flows in the borehole;

forming a heat transfer portion for acquiring geothermal heat from a shallow geothermal source section by filling a shallow geothermal source section of the borehole with a heat conductive grouting material; and forming a thermal insulation portion by providing at least one stackable thermal insulation cartridge in a ground surface section of the borehole, wherein the stackable thermal insulation cartridge is composed of an inner pipe and an outer pipe, a thermal insulation material is filled in a space between the inner pipe and the outer pipe.

18. The method of constructing a geothermal heat exchange system according to claim 17, wherein a thermal insulation grouting material is filled in the inner pipe, and said heat exchange pipes are located inside the inner pipe.

19. The method of constructing a geothermal heat exchange system according to claim 18, wherein the thermal insulation grouting material is a high porosity foamed concrete ("HPFC").

20. The method of constructing a geothermal heat exchange system according to claim 17, further comprising a step of constructing a trench with a thermal insulation grouting material, in which the inner pipe and the outer pipe of the geothermal heat exchange system and a heat pump are connected via a manifold.

* * * * *